(12) United States Patent
Marotte

(10) Patent No.: US 9,554,514 B2
(45) Date of Patent: Jan. 31, 2017

(54) ROTARY CUTTER IMPLEMENT WITH BALL JOINT CONNECTION TO A POWER MACHINE

(71) Applicant: Clark Equipment Company, West Fargo, ND (US)

(72) Inventor: David Edward Marotte, Litchfield, MN (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 13/830,870

(22) Filed: Mar. 14, 2013

(65) Prior Publication Data
US 2014/0260149 A1 Sep. 18, 2014

(51) Int. Cl.
*A01D 34/66* (2006.01)
*A01D 67/00* (2006.01)
*A01D 34/86* (2006.01)

(52) U.S. Cl.
CPC ........... *A01D 67/005* (2013.01); *A01D 34/661* (2013.01); *A01D 34/866* (2013.01)

(58) Field of Classification Search
USPC ....... 56/14.9, 15.2, 15.3, 15.7–15.9; 280/511
See application file for complete search history.

(56) References Cited

U.S. PATENT DOCUMENTS

| | | | |
|---|---|---|---|
| 2,067,158 A * | 1/1937 | Moyer | 56/7 |
| 2,100,910 A * | 11/1937 | Moyer | A01D 75/306 56/7 |
| 2,139,200 A * | 12/1938 | Moyer | A01D 75/306 172/311 |
| 2,699,957 A * | 1/1955 | White | A01D 75/306 280/485 |
| 2,821,831 A * | 2/1958 | Thompson | A01D 34/73 172/68 |
| 2,869,304 A * | 1/1959 | Colburn | 56/13.6 |
| 2,991,612 A | 7/1961 | Holmes | |
| 3,097,465 A * | 7/1963 | Williams | 56/7 |
| 3,135,079 A | 6/1964 | Dunn | |
| 3,559,385 A * | 2/1971 | Eaton | A01D 34/866 56/10.7 |
| 4,426,829 A * | 1/1984 | Johnson | A01D 34/866 56/10.4 |
| 4,445,312 A | 5/1984 | Cartner | |
| 4,453,372 A * | 6/1984 | Remer | 56/13.7 |
| 4,481,755 A * | 11/1984 | Carr | A01D 75/30 56/16.2 |
| 4,688,375 A * | 8/1987 | Mattson | 56/7 |

(Continued)

*Primary Examiner* — Alicia Torres
(74) *Attorney, Agent, or Firm* — Michael Best & Friedrich LLP

(57) ABSTRACT

A rotary cutter implement includes a carrier interface, a frame, and a mower deck including a ball joint interconnecting the mower deck with the frame. The ball joint enables freedom of movement of the mower deck with respect to the frame. A hydraulic motor is mounted on an upper surface of the mower deck and includes an output shaft extending through the mower deck. The hydraulic motor is adapted to operate under the influence of hydraulic fluid provided by the power machine. A rotary cutting blade is operably coupled to the output shaft and rotatable under the mower deck in response to operation of the hydraulic motor.

10 Claims, 8 Drawing Sheets

(56) References Cited

U.S. PATENT DOCUMENTS

| | | | | |
|---|---|---|---|---|
| 4,744,580 A | * | 5/1988 | Ryan | B60D 1/02 56/6 |
| 4,829,754 A | | 5/1989 | Shimamura et al. | |
| 4,854,112 A | * | 8/1989 | Holley | A01D 75/30 172/269 |
| 4,869,056 A | * | 9/1989 | Lynch | 56/15.2 |
| 4,926,621 A | * | 5/1990 | Torras | A01D 75/30 280/494 |
| 5,280,695 A | * | 1/1994 | Nunes, Jr. | A01D 75/30 56/13.5 |
| 5,375,398 A | * | 12/1994 | McClymonds | 56/15.2 |
| 5,378,852 A | * | 1/1995 | Manor | 144/4.1 |
| 5,435,117 A | | 7/1995 | Eggena | |
| 5,511,368 A | * | 4/1996 | Kocher | 56/15.2 |
| 5,537,808 A | * | 7/1996 | Dallman | 56/15.2 |
| 5,562,398 A | | 10/1996 | Knutson | |
| 5,666,794 A | * | 9/1997 | Vought et al. | 56/15.2 |
| 5,694,752 A | * | 12/1997 | Warfield, III | A01D 67/00 56/12.1 |
| 5,706,638 A | | 1/1998 | Kinder et al. | |
| 5,938,399 A | | 8/1999 | Knutson | |
| 6,116,007 A | | 9/2000 | Eggena et al. | |
| 6,131,378 A | * | 10/2000 | Lees | A01D 75/303 56/13.6 |
| 6,138,444 A | | 10/2000 | Torras, Sr. | |
| 6,360,459 B1 | | 3/2002 | Brookhart et al. | |
| 6,497,086 B2 | | 12/2002 | Bergsten et al. | |
| 6,604,353 B1 | * | 8/2003 | Johnson | 56/228 |
| 6,655,899 B1 | | 12/2003 | Emerson | |
| 6,758,031 B2 | | 7/2004 | Franet et al. | |
| 6,854,250 B2 | | 2/2005 | Boyko | |
| 6,865,827 B2 | | 3/2005 | Smith et al. | |
| 6,951,253 B1 | * | 10/2005 | Linsmeier | 172/25 |
| 6,997,667 B2 | | 2/2006 | Hackett et al. | |
| 7,223,062 B1 | | 5/2007 | Emerson | |
| 7,347,036 B1 | * | 3/2008 | Easley, Jr. | A01D 75/30 172/313 |
| 7,470,100 B2 | | 12/2008 | Hackett et al. | |
| 7,621,112 B2 | * | 11/2009 | Slattery et al. | 56/11.9 |
| 7,775,024 B2 | | 8/2010 | Boyko | |
| 2002/0100266 A1 | * | 8/2002 | Greenwell | A01D 34/4161 56/12.7 |
| 2004/0128969 A1 | | 7/2004 | Meurer | |
| 2005/0005586 A1 | * | 1/2005 | Schmidt et al. | 56/7 |
| 2006/0053761 A1 | | 3/2006 | Lougheed et al. | |

\* cited by examiner

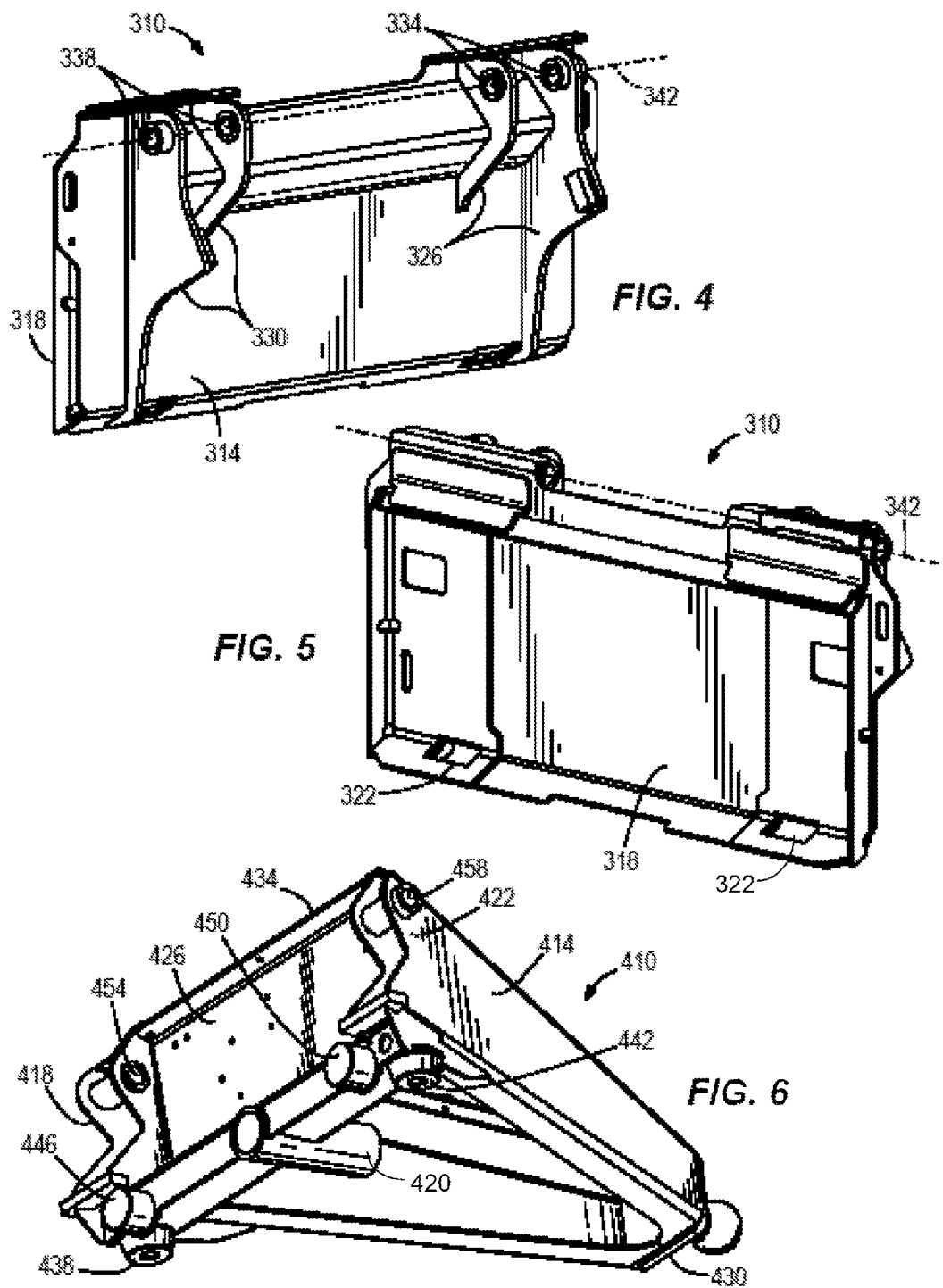

ROTARY CUTTER IMPLEMENT WITH BALL JOINT CONNECTION TO A POWER MACHINE

FIELD

The present invention relates to implements for use with power machines, and more specifically to rotary cutter implements.

BACKGROUND

Conventional rotary cutter implements that are designed for attachment to a power machine typically include a support structure and a mower supported by the support structure that moves over the ground to cut vegetation underneath the mower. These rotary cutter implements may achieve a relatively even height of cut if the ground is flat. However, often times rotary cutter implements are used on slanted or uneven terrain, such as hills, ditches, and the like. In such circumstances, the support structure may inhibit the mower from conforming to the terrain. As such, the mower may produce an uneven height of cut or may not be able to cut certain areas altogether.

The discussion above is merely provided for general background information and is not intended to be used as an aid in determining the scope of the claimed subject matter.

SUMMARY

A rotary cutter implement for a power machine includes a carrier interface including a frame. The carrier interface is couplable to the power machine. The rotary cutter implement also includes a mower deck including a ground engaging feature and a pivoting joint interconnecting the mower deck with the frame. The pivoting joint enables some freedom of movement of the mower deck with respect to the frame. The rotary cutter implement also includes an actuator mounted to the mower deck. The rotary cutter implement also includes a rotary cutting blade operably coupled to the actuator and rotatable under the mower deck in response to operation of the actuator. The ground engaging feature engages terrain as the rotary cutting blade rotates. The mower deck pivots about the pivoting joint.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a front perspective view of a carrier interface of the rotary cutter implement.

FIG. 5 is a rear perspective view of the carrier interface.

FIG. 6 is a perspective view of a frame assembly of the rotary cutter implement.

DETAILED DESCRIPTION

The concepts disclosed herein are not limited in their application to the details of construction and the arrangement of components set forth in the following description or illustrated in the following drawings. That is, the embodiments disclosed herein are illustrative in nature. The concepts illustrated in these embodiments are capable of being practiced or being carried out in various ways. The terminology used herein is for the purpose of description and should not be regarded as limiting. Words such as "including," "comprising," and "having" and variations thereof as used herein are meant to encompass the items listed thereafter, equivalents thereof, as well as additional items.

Figure 1:
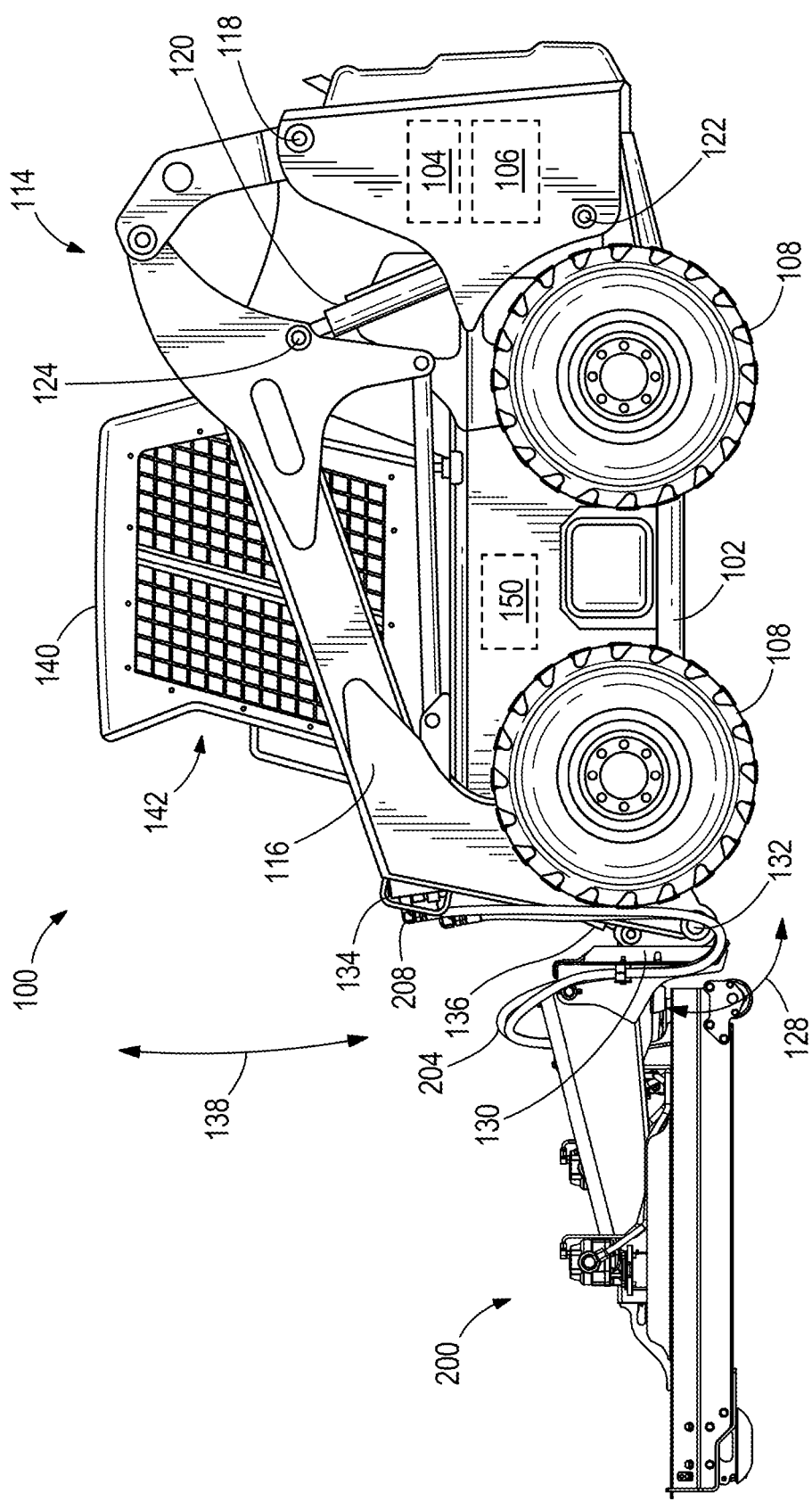
FIG. 1 is a side elevation view of an exemplary embodiment of a power machine for use with a rotary cutter implement according to the present invention.

FIG. 1 is a side elevation view of a representative power machine 100 to which an implement of the disclosed embodiments can be mounted. The power machine 100 illustrated in FIG. 1 is a skid loader, but other types of power machines such as tracked loaders, steerable wheeled loaders, including all-wheel steer loaders, excavators, telehandlers, walk behind loaders, and utility vehicles, to name but a few examples, may employ the disclosed embodiments. The power machine 100 includes a supporting frame assembly or main frame assembly 102 that supports a power source 104, which in some embodiments is an internal combustion engine. Alternatively, the power source for a representative power machine can be an electrical power source, a combination of an internal combustion engine and an electrical power source, or suitable power sources or combinations of power sources. A power conversion system 106 is operably coupled to the power source 104. Power conversion system 106 illustratively receives power from the power source 104 and control signals from operator inputs and converts the received power to power signals in a form that is provided to and utilized by functional components of the power machine in response to the received control signals. In some embodiments, such as with the power machine 100 in FIG. 1, the power conversion system 106 includes hydraulic components such as one or more hydraulic pumps and various actuators and valve components that are illustratively employed to receive and selectively provide power signals in the form of pressurized hydraulic fluid to some or all of the actuators used to control functional components of the power machine 100. For example, a power conversion system can include electric generators or the like to generate electrical control signals to power electric actuators. As another example, a power conversion system for a representative power machine can include mechanical components such as drive shafts or power take-off shafts.

Among the functional components that are capable of receiving power signals from the power conversion system 106 are tractive elements 108, illustratively shown as wheels, which are configured to rotatably engage a support surface to cause the power machine to travel. Other examples of power machines can have tracks or other tractive elements instead of wheels. In an example embodiment, a pair of hydraulic motors (not shown in FIG. 1), are provided to convert a hydraulic power signal into a rotational output. In power machines such as skid steer loaders, a single hydraulic motor can be operatively coupled to both of the wheels on one side of the power machine. Alternatively, a hydraulic motor can be provided for each tractive element in a machine. In a skid steer loader, steering is accomplished by providing unequal rotational outputs to the tractive element or elements on one side of the machine as opposed to the other side. In some power machines, steering is accomplished through other means, such as steerable axles.

The power machine 100 also includes a lift arm structure 114 that is capable of being raised and lowered with respect to the frame assembly 102. The lift arm structure 114 illustratively includes a lift arm 116 that is pivotally attached to the frame assembly 102 at attachment point 118. An actuator 120, which in some embodiments is a hydraulic cylinder configured to receive pressurized fluid from power conversion system 106, is pivotally attached to both the frame assembly 102 and the lift arm 116 at attachment points 122 and 124, respectively. Actuator 120 is sometimes referred to as a lift cylinder, and is a representative example of one type of actuator that may be used in a power machine 100. Extension and retraction of the actuator 120 causes the lift arm 116 to pivot about attachment point 118 so that attachment point 132 (discussed in more detail below) is thereby raised and lowered along a path generally indicated by arrow 138. The lift arm structure 114 is representative of a type of lift arm structure that may be attached to the power machine 100. The lift arm structure 114 shown in FIG. 1 includes a second lift arm and actuator disposed on an opposite side of the of the power machine 100, although neither is shown in FIG. 1. The lift arm structure 114 shown in FIG. 1 is known generally as a vertical path lift arm structure, because the lift path (represented by arrow 138) is generally, although not necessarily exactly, vertical. Other machines similar in general configuration to the power machine 100 (i.e. a loader or other power machine having a lift arm structure with a pair of lift arms disposed on either side of its frame) can have other types of lift arm structures. One additional example is a lift arm structure that has a radial lift path. Other lift arm structures, with different geometries, components, and arrangements can be coupled to the power machine 100 or other power machines upon which the embodiments discussed herein can be practiced without departing from the scope of the present discussion. Excavators, to name one example, can have a single lift arm disposed on one side of an upper frame so that the entire lift arm structure is positioned generally distally from the rest of the machine during operation instead of having a significant portion of the lift arm structure positioned along a portion of the power machine as is the case with power machine 100. Other power machines have lift arm structures with a single lift arm positioned on one side of the machine. Any of the above examples can also have a telescoping lift arm structure as well.

An implement carrier 130 is pivotally attached to the lift arm structure 114 at attachment point 132. Implement carrier 130 is advantageously capable of accepting and securing any of a number of implements thereto. The implement carrier 130 shown in FIG. 1 allows for attachment and release of implements without the use of any tools. Other types of implement carriers require the use of tools or attachment devices such as pins to attach an implement. Still other power machines do not have implement carriers and instead require that an implement be configured to be attached to the lift arm directly at attachment point 132 such as by pinning the implement to the lift arm. One or more actuators such as hydraulic cylinder 136 are pivotally attached to the implement carrier 130 and the lift arm structure 114 to cause the implement carrier to rotate under power about an axis that extends through the attachment point 132 in an arc approximated by arrow 128 in response to operator input. The one or more actuators 136 are sometimes known as tilt actuators or tilt cylinders, as they control a rotational position of the implement carrier with respect to the lift arm structure. In some embodiments, the one or more actuators pivotally attached to the implement carrier and the lift arm assembly are hydraulic cylinders capable of receiving pressurized hydraulic fluid from the power conversion system 106. In these embodiments, the one or more hydraulic cylinders 136 are further representative examples of actuators that may be used in a power machine 100. The attachment point 132, then, is a reference for positioning the implement carrier 130 and, by extension and implement that may be carried by it, with respect to the lift arm structure (i.e "tilt") and the power machine frame (i.e. "lift").

Power machine 100 also illustratively includes a cab 140 that is supported by the frame assembly 102 and defines, at least in part, an operator compartment 142. Operator compartment 142 typically includes an operator seat (not shown in FIG. 1) and operator input devices and display devices accessible and viewable from a sitting position in the seat. When an operator is seated properly within the operator compartment 142, the operator can manipulate operator input devices to control such functions as driving the power machine 100, raising and lowering the lift arm structure 114, rotating the implement carrier 130 about the lift arm structure 114 and making power and control signals available to implement via the sources available at port 134.

In some embodiments, an electronic controller 150 is configured to receive input signals from at least some of the operator input devices and provide control signals to the power conversion system 106 and to implements via port 134. It should be appreciated that electronic controller 150 can be a single electronic control device with instructions stored in a memory device and a processor that reads and executes the instructions to receive input signals and provide output signals all contained within a single enclosure. Alternatively, the electronic controller 150 can be implemented as a plurality of electronic devices coupled on a network. The disclosed embodiments are not limited to any single implementation of an electronic control device or devices. The electronic device or devices such as electronic controller 150 are programmed and configured by the stored instructions to perform a variety of functions and operations, including any that are described below.

As discussed above, the implement carrier 130 is configured to accept and secure any one of a number of different implements to the power machine 100 as may be desired to accomplish a particular work task. Many implements that include various actuators such as cylinders and motors, to name two examples, can be attached to the implement carrier 130 to accomplish a variety of tasks. A partial list of the types of implements that can be attached to the implement carrier 130 includes rotary cutters, augers, planers, graders, combination buckets, wheel saws, and the like. These are only a few examples of the many different types of implements that can be attached to power machine 100. The power machine 100 provides a source, accessible at port 134, of power and control signals that can be coupled to an implement to control various functions on such an implement, in response to operator inputs. In one embodiment, port 134 includes hydraulic couplers that are connectable to the implement for providing power signals in the form of pressurized fluid provided by the power conversion system 106 for use by an implement that is operably coupled to the power machine 100. Alternatively or in addition, port 134 includes electrical connectors that can provide power signals and control signals to an implement to control and enable actuators of the type described above to control operation of functional components on an implement. Actuation devices located on an implement are controllable using a control valve assembly of power conversion system 106 and/or control valves located on the implement itself.

Figure 2:
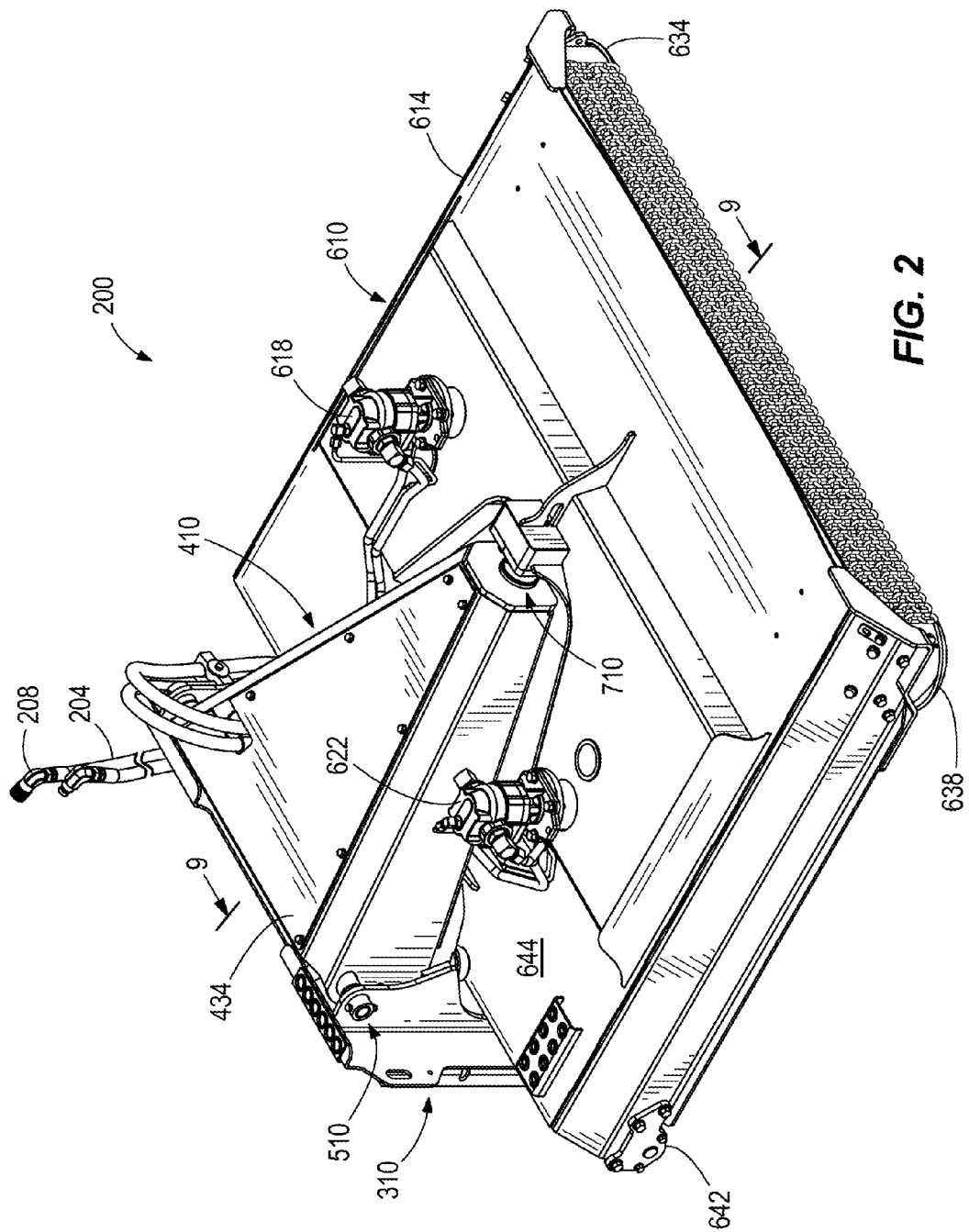
FIG. 2 is a perspective view of the rotary cutter implement.
Figure 3:
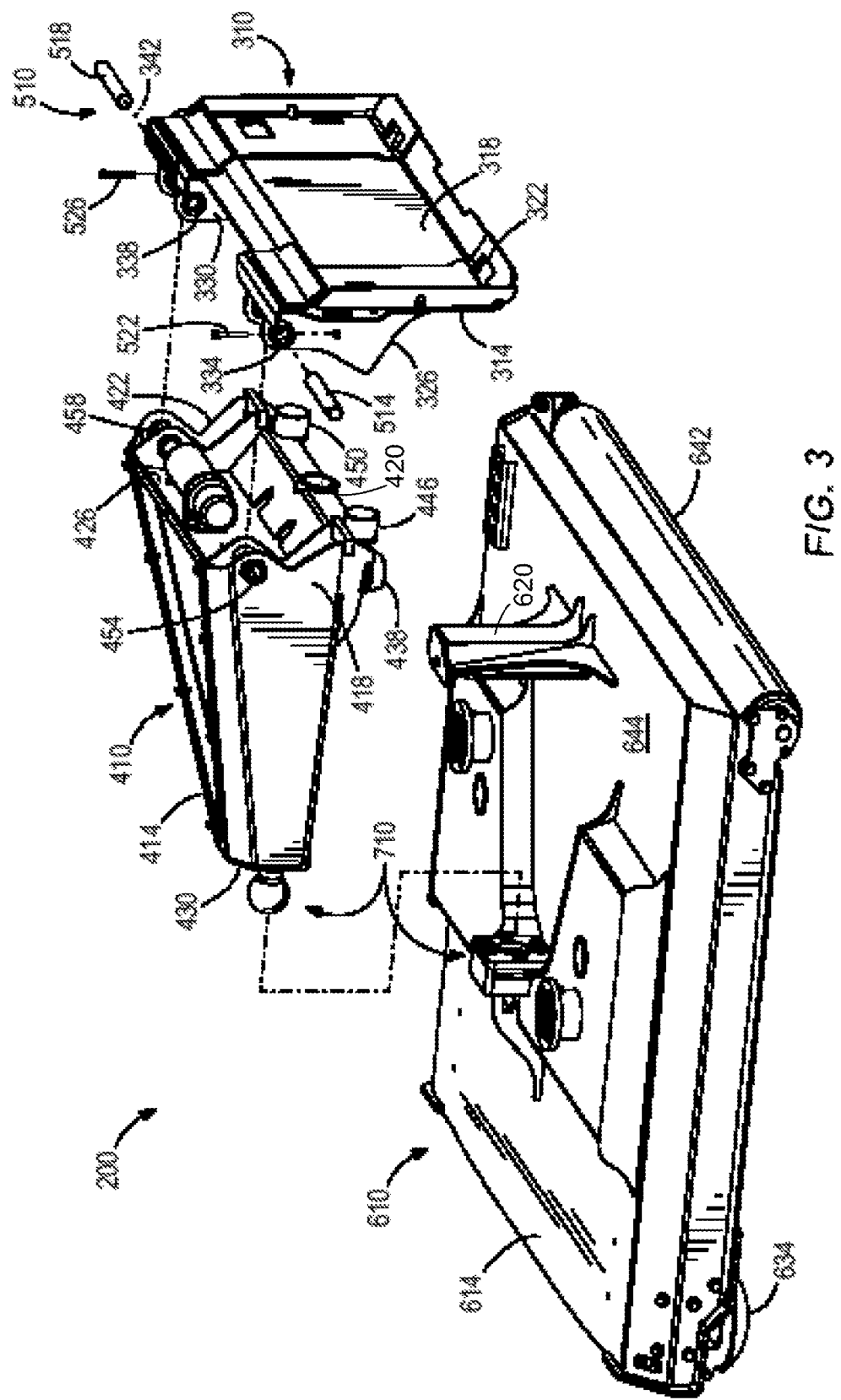
FIG. 3 is an exploded perspective view of the rotary cutter implement.

An exemplary embodiment of a rotary cutter implement 200 is shown as being attached to the power machine 100 in FIG. 1 and FIGS. 2-3 provide additional views of the rotary cutter implement 200 (also referred to herein as "the implement") configured for use with the power machine 100 of FIG. 1. As it relates to the description of the implement 200, the terms "front," "rear," "left," "right," "up," "down," and variations of those terms will be used in this specification from the perspective of an operator of the implement 200 during ordinary operation (e.g., from the operator seat of the power machine 100). The implement 200 includes a carrier interface 310 couplable to the power machine 100 (at implement carrier 130) such that the implement 200 may be attached to the power machine 100 for movement therewith along a surface (e.g., the ground). The implement 200 may be detached from the power machine 100 when the operator desires to use the power machine 100 without the implement 200.

Figure 8:
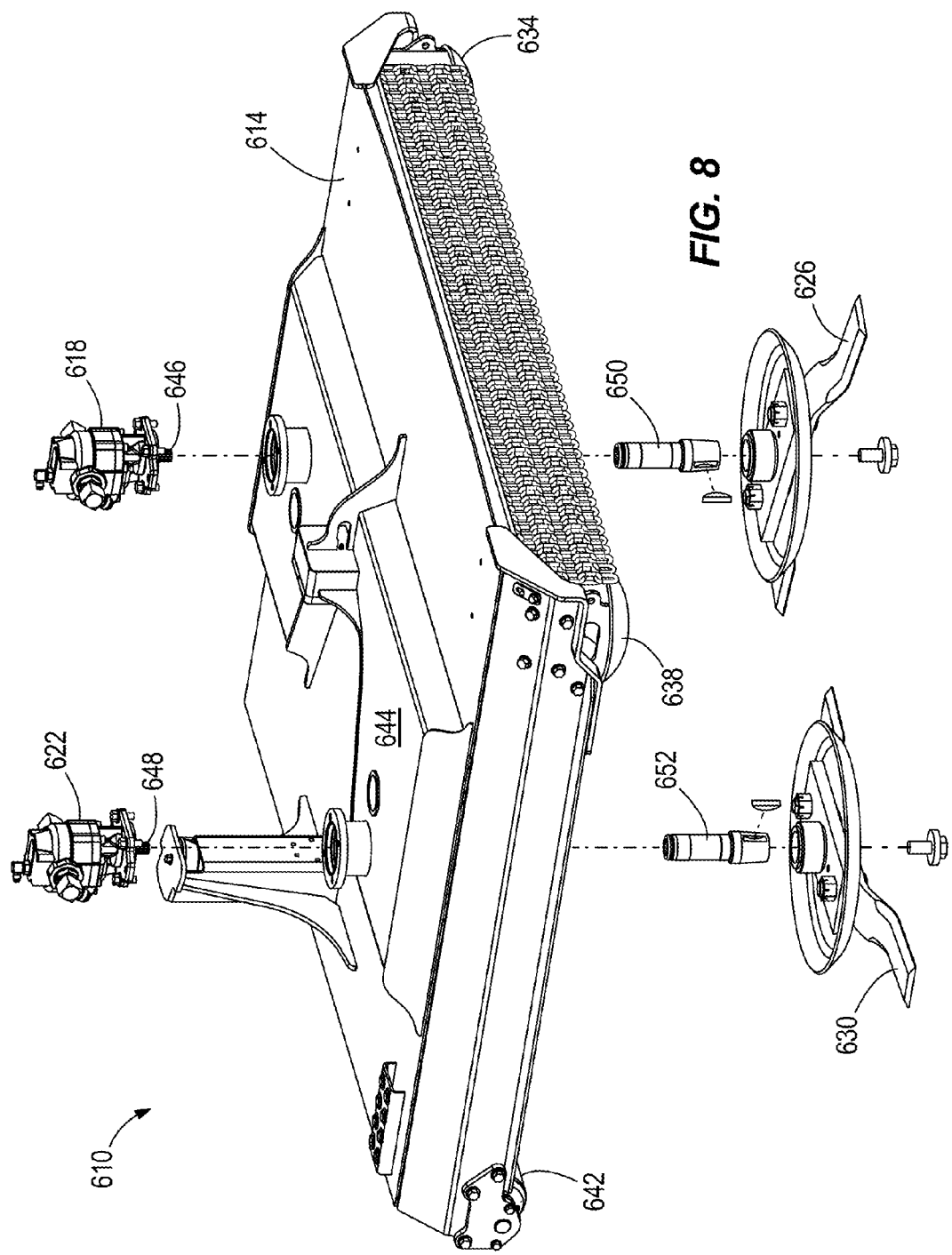
FIG. 8 is a perspective, partially exploded view of a mower assembly of the rotary cutter implement.

The implement 200 also includes a frame assembly 410, a pivot assembly 510, a mower assembly 610 operable to cut vegetation (e.g., grass), and a pivoting joint 710. The mower assembly 610 is carried by frame assembly 410 via the pivoting joint 710 and an engagement of tower 620 (best shown in FIG. 3) with tube 420 (best shown in FIG. 6), which extends generally forward from a plane on a front side of base plate 426. The connection between the mower assembly and the frame assembly will be discussed in more detail below, but having a pivoting joint between the frame assembly 410 and the mower assembly 610 allows for freedom of movement for the mower assembly over uneven terrain. The frame assembly 410 is, in turn, pivotally coupled to the carrier interface 130 the pivot assembly 510. The mower assembly 610 includes a pair of actuators 618 and 622 in the form of hydraulic motors (although other types of actuators such as electric motors can be used) that each selectively actuate one or more mower blades 626 and 630 as shown in FIG. 8. In the illustrated embodiment, the implement 200 includes input lines 204 having hydraulic couplers 208 that are connectable to the port 134 of the power machine 100 for transmitting power signals and control signals to the implement 200 in the form of pressurized fluid provided by the power conversion system 106 (FIG. 1). Alternatively or in addition, the input lines 204 may include electrical connectors (not shown) that can provide power signals and control signals to the implement 200. The power signals provided to the implement 200 are illustratively used to control operation of the actuators 618 and 622. In other embodiments, the implement 200 may not receive power signals or control signals from the power machine 100 and may be independently powered and/or controlled.

With reference to FIGS. 4 and 5, the carrier interface 310 includes a front side 314 and a rear side 318. The rear side 318 of the carrier interface 310 includes mounting features 322 configured to mate with cooperating mounting features (not shown) located on the implement carrier 130 of the power machine 100 (FIG. 5). The specific structure, arrangement, and quantity of the respective mounting features may vary depending upon the type of power machine and/or implement carrier used in conjunction with an implement. In the illustrative embodiment, the front side 314 of the carrier interface 310 includes left and right supporting brackets 326, 330 that are configured to support the frame assembly 410 and the mower assembly 610. The left and right supporting brackets 326, 330 each include apertures 334, 338, the respective apertures 334, 338 collectively defining a frame pivot axis 342 along which the frame assembly 410 is pivotally coupled to the supporting brackets.

With reference to FIG. 6, the frame assembly 410 of the implement 200 includes a main frame member 414, left and right support brackets 418, 422, and a plurality of bumpers. The main frame member 414 is configured to carry the mower assembly 610 and includes a base plate 426, a fore plate 430, and an upper plate 434, all of which are rigidly interconnected. Alternatively, the main frame member 414 may be formed as a single piece or may include any number and arrangement of pieces. The main frame member 414 is formed from a rigid material (e.g., steel) of sufficient strength to bear the combined weight of the frame assembly 410 and the mower assembly 610.

In the illustrated embodiment, the plurality of bumpers includes a left lower bumper 438, a right lower bumper 442, a left rear bumper 446, and a right rear bumper 450. The lower bumpers 438, 442 are secured to a bottom side of the main frame member 414, and the rear bumpers 446, 450 are secured to a rear side of the main frame member 414. The lower bumpers 438 and 442 act as engagement surfaces between the frame assembly 410 and the mower deck 614 as the mower deck pivots with respect to the frame assembly 410. Likewise, the rear bumpers 446 and 450 act as engagement surfaces between the frame assembly 410 and the carrier interface 310 as the frame assembly pivots with respect to the carrier interface.

The left and right supporting brackets 418, 422 extend rearwardly of the main frame member 414 and are configured to engage and be pivotally secured to the carrier interface 310 along the frame pivot axis 342. The left and right supporting brackets 418, 422 each include an aperture 454, 458, the respective apertures 454, 458 being coaxially aligned with the frame pivot axis 342 when the frame assembly 410 is coupled to the carrier interface 310.

With reference to FIG. 3, the pivot assembly 510 pivotally couples the frame assembly 410 and the carrier interface 310 according to one illustrative embodiment. The pivot assembly 510 includes left and right pivot shafts 514, 518 and left and right retaining pins 522, 526. The left pivot shaft 514 extends through the apertures 334, 454 of the left supporting brackets 326, 418, and the right pivot shaft 518 extends through the apertures 338, 458 of the right supporting brackets 330, 422. Other pivot assemblies and pivot assembly components can be employed to pivotally couple the frame assembly to the carrier interface without departing from the scope of the discussion. The retaining pins 522, 526 retain the pivot shafts 514, 518 within the respective apertures 334, 454, 338, 458 of the supporting brackets 326, 418, 330, 422. Accordingly, the pivot assembly 510 permits the frame assembly 410 to pivot with respect to the carrier interface 310 about the frame pivot axis 342.

Figure 7:
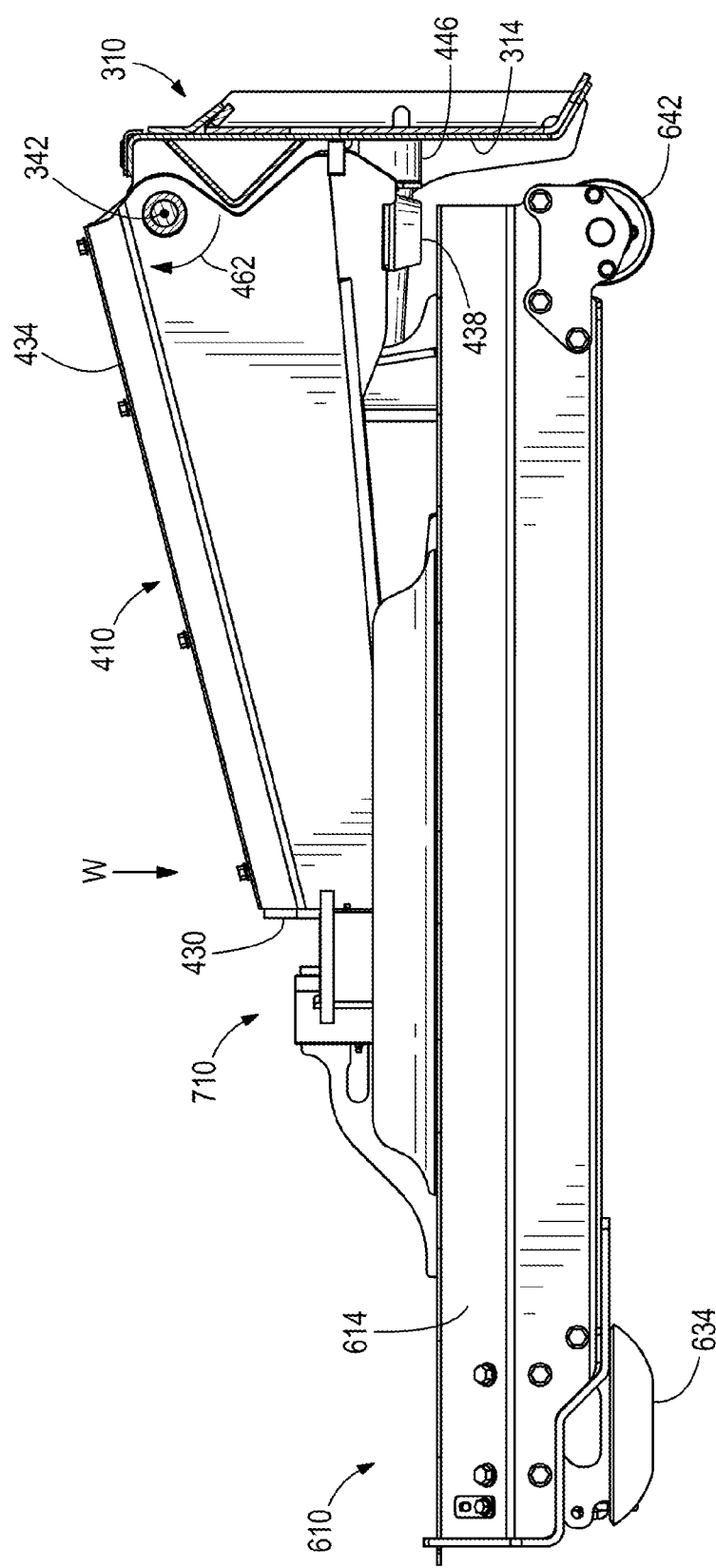
FIG. 7 is a side elevation view of the frame assembly coupled to a mower assembly and the carrier interface.

Now referring to FIG. 7, downward pivoting of the frame assembly 410 about the frame pivot axis 342 (i.e., movement of a front end of the frame assembly 410 in a generally downward direction) is limited by abutting contact between the rear bumpers 446, 450 and the front side 314 of the carrier interface 310. Alternatively, downward pivoting of the frame assembly 410 about the frame pivot axis 342 may be limited by abutting contact between the frame assembly 410 and one or more bumpers disposed on the carrier interface 310. In the illustrated embodiment, the rear bumpers 446, 450 are configured to abut the front side 314 of the carrier interface 310 at an angular position of the frame assembly 410 in which the fore plate 430 of the frame assembly 410 is generally parallel with the front side 314 of the carrier interface 310. This angular position is illustrated in FIG. 7 and will be referred to herein as a full-down position of the frame assembly 410. In other embodiments, the angular position of the frame assembly with respect to the carrier interface is something other than generally parallel with the front side 314 of the carrier interface 310. During ordinary operation, the influence of gravity generally causes the frame assembly 410 to pivot toward the full-down position, in a direction generally represented by arrow W. Upward pivoting of the frame assembly 410 about the frame pivot axis 342 (i.e., movement of the front end of the frame assembly 410 in a generally upward direction) may occur when an upward force (not shown) is applied to the frame assembly 410 of sufficient magnitude to overcome the combined weight W of the frame assembly 410 and the mower assembly 610. For example, engagement between the mower assembly 610 and an inclined surface (e.g., a hill) may induce upward pivoting of the frame assembly 410 in an arc approximated by arrow 462.

With reference to FIG. 8, the mower assembly 610 includes a mower deck 614, left and right actuators 618, 622, left and right rotary cutting blades 626, 630, left and right front ground engaging features 634, 638, and at least one rear ground engaging feature 642. The mower deck 614 includes an upper surface 644, and supports the other components of the mower assembly 610.

In the illustrated embodiment, the left and right actuators 618, 622 are hydraulic motors configured to receive power signals in the form of pressurized fluid from the power machine 100 via the input lines 204, as discussed above. One or more valves or regulators may be included between the input lines 204 and the actuators 618, 622 to control the pressure or flow of the pressurized fluid through the actuators 618, 622. The actuators 618, 622 convert flow of the pressurized fluid into torque and angular displacement applied to output shafts 646, 648 of the respective motors 618, 622. In other embodiments, the left and right actuators 618, 622 may be any other type of actuator such as an electric motor, an output shaft of an internal combustion engine, or any other suitable device operating on suitable fuels or power sources.

The actuators 618, 622 are illustratively mounted on the upper surface 644 of the mower deck 614 and are oriented perpendicular to the mower deck 614 (FIG. 8). However, in other embodiments, other mounting arrangements for the actuators 618 and 622 can be employed. A pair of spindles 650, 652 are interconnected between the output shafts 646, 648 at one end and the left and right rotary cutting blades 626, 630 at the opposite end. The spindles 650, 652 are supported by bearing assemblies in the mower deck 614. The spindles 650, 652 may be considered extensions of the motor output shafts 646, 648. The motor output shafts 646, 648 may therefore be said to extend through the mower deck 614. The output shafts 646, 648 are operably coupled to the respective cutting blades 626, 630 through the spindles 650, 652.

The cutting blades 626, 630 receive torque from the actuators 618, 622 through the output shafts 646, 648 and spindles 650, 652. The actuators 618, 622 drive the cutting blades 626, 630 to cut vegetation (e.g., grass) under the mower deck 614. Any number and arrangement of actuators may be included in any orientation (e.g., a horizontal orientation). Such motors may include suitable drivetrains or transmissions configured to operably couple the actuators with any suitable number and arrangement of rotary cutting blades.

The left and right front ground engaging features 634, 638 are coupled to the underside of the mower deck 614. The front ground engaging features 634, 638 are configured to slide or roll along the ground during ordinary operation of the implement 200 and in one embodiment have a generally frustoconical shape. In the embodiment shown, a single ground engaging feature 642 in the form of an elongated roller is coupled to the rear underside of the mower deck 614. The rear ground engaging feature 642 is configured to roll along the ground during ordinary operation of the implement 200.

Figure 9:
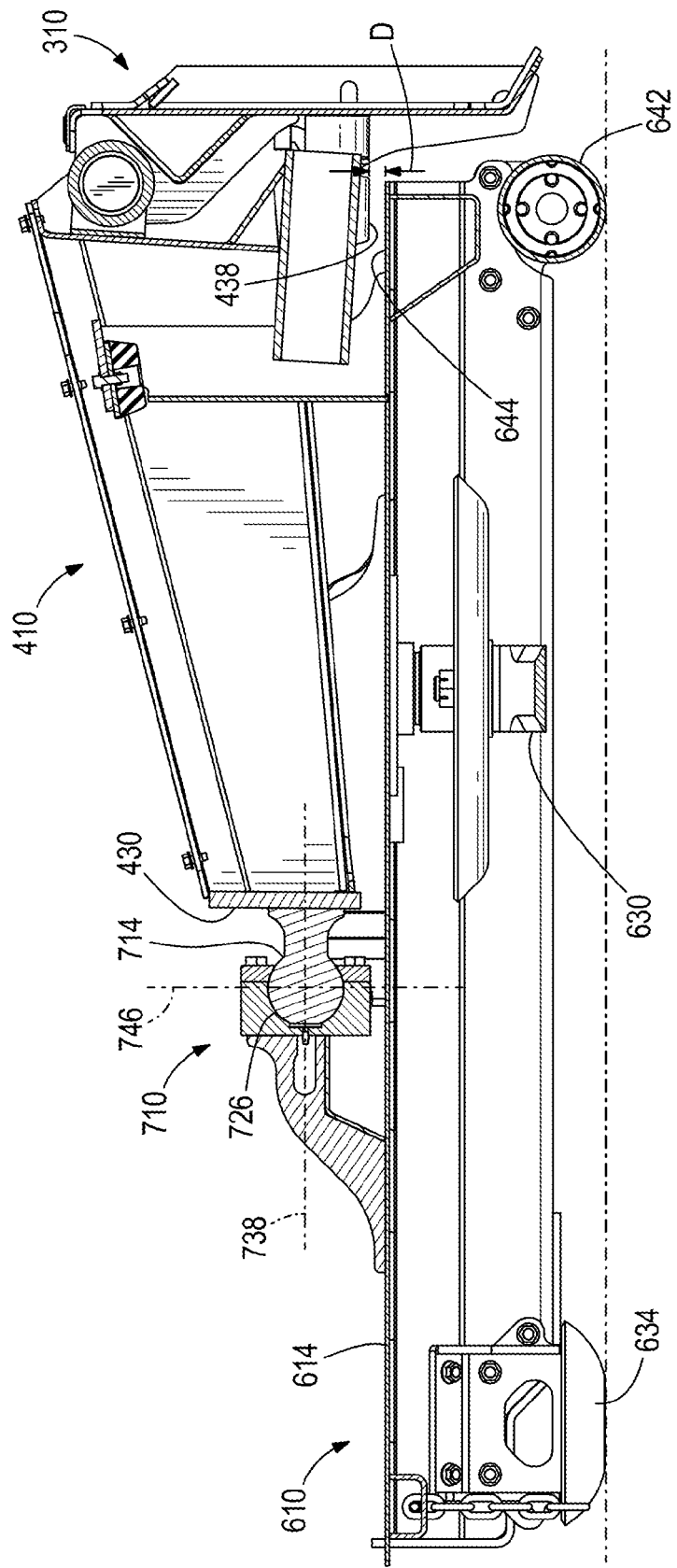
FIG. 9 is a cross-sectional view of the mower assembly.
Figure 10:
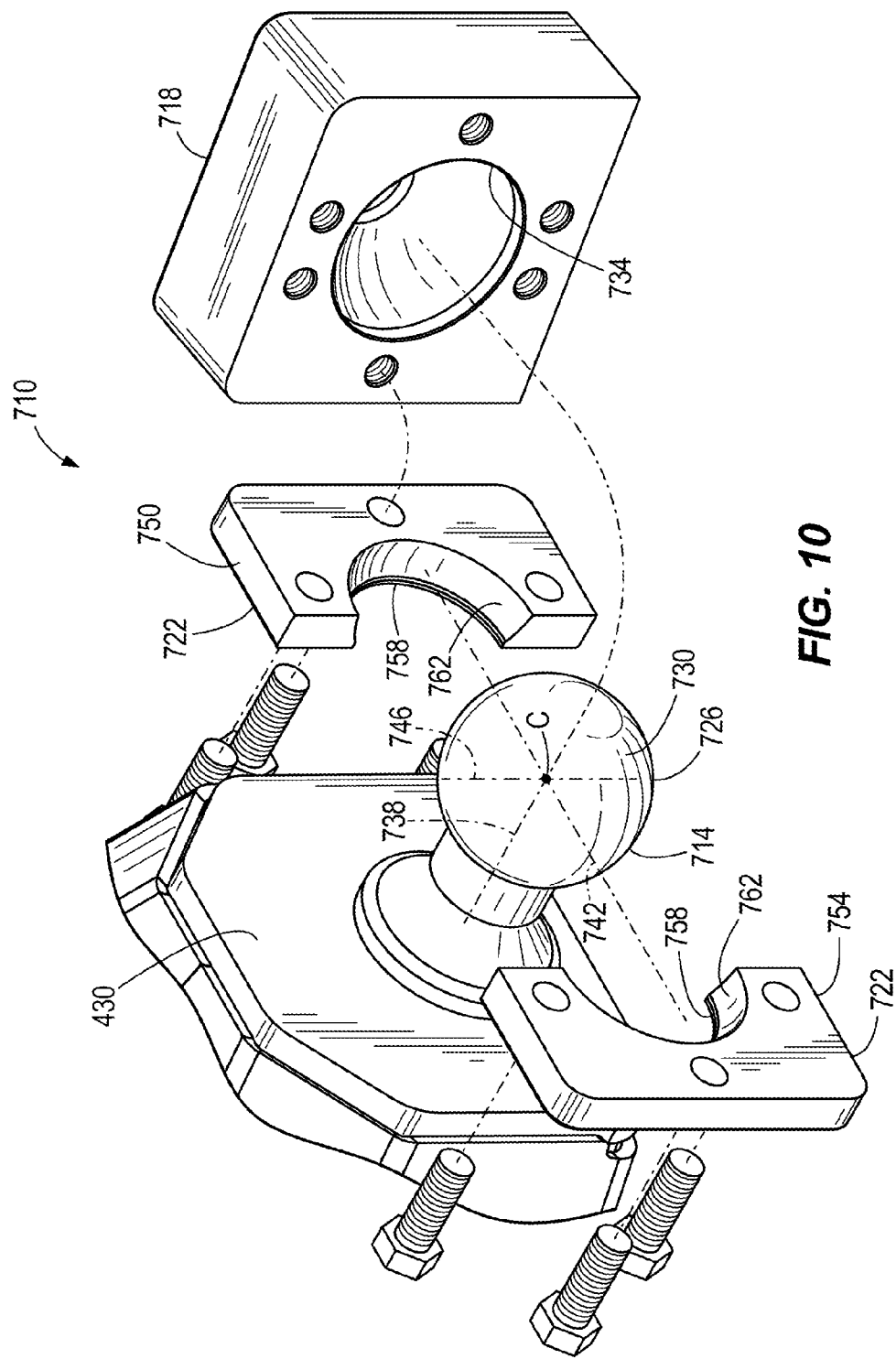
FIG. 10 is an exploded view of a ball joint interconnecting the mower assembly to the frame assembly.

Now referring to FIGS. 9 and 10, one embodiment of a pivoting joint 710 for interconnecting the mower deck 614 and the frame assembly 410 is shown. The pivoting joint 710 includes a ball 714, a socket 718, and a split retaining flange 722 (FIG. 10). In the illustrated embodiment, the ball member 714 is secured to the fore plate 430 of the frame assembly 410 and the socket 718 is secured to the mower deck 614 (FIG. 9). However, the various parts of the ball joint 710 may be arranged and secured in any suitable manner.

The ball 714 includes a bearing end 726 having a spherical bearing surface 730 that is received within a corresponding hemispherical bearing surface 734 of the socket 718 to interconnect the mower deck 614 to the frame assembly 410. The bearing surfaces 730, 734 are pivotable relative to one another to enable freedom of movement of the mower deck 614 with respect to the frame assembly 410. Particularly, the pivoting joint 710 permits the mower deck 614 to pivot about the pivoting joint 710 in any direction. For example, the pivoting joint 710 permits the mower deck 614 to pivot about a first axis 738 (which can also be called a roll axis) extending through the center C of a spherical volume defined by the spherical bearing surface 730. The pivoting joint 710 further permits the mower deck 614 to pivot about a second axis 742 (which can also be called a pitch axis) orthogonal to the first axis 738, and about a third axis 746 (which can also be called a yaw axis) orthogonal to both the first and second axes 738 and 742. The engagement of tube 420 with tower 620 serves to limit rotation about the third axis 746.

The split retaining flange 722 includes two flange halves 750, 754 that cooperate to define an opening 758 (FIG. 10). The opening 758 has a minimum diameter less than the diameter of the spherical bearing surface 730 of the ball 714. The separable flange halves 750, 754 permit the split retaining flange 722 to be fastened to the socket 718 after the ball 714 is inserted into the socket 718. The opening 758 has an internal contour 762 corresponding to a section of the spherical bearing surface 730 of the ball 714. As such, the internal contour 762 of the split retaining flange 722 acts as an extension of the socket's bearing surface 734 and does not interfere with the freedom of movement of the mower deck 614 with respect to the frame assembly 410.

With reference to FIG. 9, the movement of the mower deck 614 with respect to the frame assembly 410 is limited by engagement between the lower bumpers 438, 442 disposed on the frame assembly 410 and the upper surface 644 of the mower deck 614. For example, a clearance distance D between the lower bumpers 438, 442 and the upper surface 644 of the mower deck 614 permits the mower deck 614 to pivot about the first axis 738 until the upper surface 644 of the mower deck 614 abuts either the left or right lower bumpers 438, 442. The movement is further limited by engagement between the ground engagement features 634, 638, 642 of the mower assembly 610 and the ground. For example, during operation of the implement 200 on a flat surface, each of the ground engaging features 634, 638, 642 engages the surface and prevents the mower deck 614 from pivoting about the pivoting joint 710. Accordingly, during operation the mower deck 614 pivots about the pivoting joint 710 to follow contours and terrain features of the ground, to an extent limited by the lower bumpers 438, 442 and the ground engaging features 634, 638, 642 and the engagement of tower 620 and tube 420.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, different types of power machines can be configured to couple with the rotary cutter implement 200. Further, while a particular assembly configuration of the implement 200 is illustrated, other configurations can also be used. Other examples of modifications of the disclosed concepts are also possible, without departing from the scope of the disclosed concepts.

What is claimed is:

1. A rotary cutter implement for a power machine, the implement comprising:
   a carrier interface that is couplable to the power machine;
   a mower assembly including a mower deck having a generally horizontal top surface;
   a frame pivotably mounted to the carrier interface about a frame pivot axis;
   a pivoting joint interconnecting the mower deck with the frame and enabling freedom of movement of the mower deck about a plurality of axes with respect to the frame at the pivoting joint, wherein the mower deck is otherwise unattached to the frame and wherein the pivoting joint is formed over the mower deck with a first portion of the pivoting joint being fixed on the frame and a second portion of the pivoting joint being fixed on the mower deck;
   a tower extending from the mower deck, the tower being configured to engage the frame when the mower deck pivots about the pivoting joint;
   an actuator mounted to the top surface of the mower deck and including an output shaft; and
   a rotary cutting blade operably coupled to the actuator and rotatable under the top surface of the mower deck in response to operation of the actuator,
   wherein engagement between the mower assembly and an inclined surface induces pivoting of the frame about the frame pivot axis.

2. The rotary cutter implement of claim 1, wherein the frame pivot axis is horizontal during ordinary operation of the rotary cutter implement.

3. The rotary cutter implement of claim 1, wherein the frame pivots about the frame pivot axis in a downward direction under the influence of gravity; the rotary cutter implement further comprising:
   a bumper mounted to one of the frame and the mower deck, the bumper being engaged between the frame and mower deck to resist pivoting of the mower deck with respect to the frame beyond a full-down position of the frame.

4. The rotary cutter implement of claim 1 and further comprising:
   a pivot shaft that couples the frame and carrier interface, and wherein the pivot axis is defined by the pivot shaft.

5. The rotary cutter implement of claim 1, wherein the actuator is a first hydraulic motor and the rotary cutting blade is a first rotary cutting blade; the rotary cutter implement further comprising: a second hydraulic motor mounted on the top surface of the mower deck and including an output shaft; and a second rotary cutting blade operably coupled to the output shaft of the second hydraulic motor and rotatable under the top surface of the mower deck in response to operation of the second hydraulic motor.

6. The rotary cutter implement of claim 1, wherein the mower deck includes a ground engaging feature that is configured to engage terrain as the rotary cutting blade rotates under the deck.

7. The rotary cutter implement of claim 6, wherein the ground engaging feature is a roller.

8. The rotary cutter implement of claim 1, wherein the pivoting joint is a pivoting ball joint.

9. The rotary cutter implement of claim 8, wherein the first portion of the pivoting ball joint includes a ball and the second portion of the pivoting ball joint includes a socket for receiving the ball.

10. A rotary cutter implement for a power machine, the implement comprising:
    a carrier interface that is couplable to the power machine;
    a mower deck;
    a frame coupled to the carrier interface;
    a pivoting joint interconnecting the mower deck with the frame and enabling freedom of movement of the mower deck about a plurality of axes with respect to the frame at the pivoting joint, wherein the mower deck is otherwise unattached to the frame and wherein the pivoting joint is formed over the mower deck with a first portion of the pivoting joint being fixed on the frame and a second portion of the pivoting joint being fixed on the mower deck;
    an actuator mounted to the mower deck and including an output shaft;
    a rotary cutting blade operably coupled to the actuator and rotatable under the mower deck in response to operation of the actuator; and
    a tower extending from the mower deck, the tower being configured to engage the frame when the mower deck pivots about the pivoting joint.

* * * * *